Patented Dec. 19, 1944

2,365,491

UNITED STATES PATENT OFFICE 2,365,491

COLD-MOLDING COMPOSITION

Paul O. Powers, Manheim Township, Lancaster County, Pa., assignor to Armstrong Cork Company, Lancaster, Pa., a corporation of Pennsylvania No Drawing. Application April 19, 1941,
Serial No. 389,330

18 Claims. (Cl. 106—235)

This invention relates to resin compositions suitable for cold-molding.

It is an object of the invention to provide resin compositions capable of being molded in one operation without the application of heat to produce articles having good appearance and capable of withstanding the wear and tear accompanying the ordinary use of such articles.

It is a further object of the invention to provide resin compositions which, even without the step of baking subsequent to the molding step usually necessary to be applied in making such articles, are sufficiently tough and hard to withstand ordinary stresses and shocks accompanying the customary use of such articles.

It is a further object of the invention to provide resin compositions which, if desired, may be baked subsequent to molding, but in which the baking need not be so carefully controlled as is necessary with the compositions heretofore used in the cold-molding process.

It is a further object of the invention to provide a simplified method of producing molded articles, the economies effected by the simplified process making it feasible to make many more molded articles on a commercial scale which it was heretofore impractical to produce on such a scale because of the expense of the materials and processes previously necessary to be employed.

Binders such as those containing hard asphalts and bitumens, stearine pitch, montan wax, and similar resinous materials, which may be, and are hereinafter generically designated by the term "pitchy," have heretofore been used in such compositions, the binder being wetted with a solvent, such as benzene. After the formation of the molded article, it is necessary to heat the article to volatilize the solvent and to produce a hardened article. It has also been common practice to mix a drying oil with the asphalt or pitch in the solvent, the subsequent baking operation being necessary to impart the required hardness to the molded article. In both cases, it is necessary to perform the baking operation with careful control to avoid formation of blisters or other forms of distortion of the articles which might result from too rapid evaporation of the solvent.

It has now been found that molded articles having sufficient hardness and durability, as well as excellent appearance, can be produced from a resinous binder which may be a pitch of mineral or organic origin without the use of volatile solvents and without the use of drying oils per se if a certain amount of a hard resin having a higher melting point and having a certain degree of incompatibility with respect to the resinous matter is incorporated as part of the binder. Besides the pitches mentioned in the preceding paragraph, the pitchy masses resulting from the combined oxidation and polymerization of fatty materials in general, such as unsaturated oils and fats, e. g. linseed oil, soya bean oil, etc. may be used. Such pitches should be in a condition of polymerization and/or oxidation such that they are reasonably hard plastic masses. An especially suitable resin to be combined with the resinous pitchy material is the alcohol-soluble, petroleum-naphtha-insoluble portion of the hydrocarbon solvent extract from pine stump wood which consists essentially of oxidized resin acids and lignin derivatives and is designated by the trade name of Vinsol. This resin, which is hereinafter designated by the term petroleum-naphtha-insoluble pine stump-wood resin for convenience, has a higher melting point than and is somewhat incompatible with the pitchy binder. Other hard resins may be used, such as coumarone-indene resins of an average molecular weight of about 600 to 700 (as determined by the freezing point method) having low solubility and having limited compatibility with the pitchy material, unmodified and rosin-modified phenolic-aldehyde resins characterized by incomplete solubility in petroleum solvents, natural resins, such as semi-fossil resins, e. g. East India gum, Batu gum, and "run" kauri gum (i. e., kauri gum which has been heated to render it semi-soluble). The hard resin imparts sufficient hardness to the final product so that no subsequent baking is necessary for hardening the product while the soft resin toughens it. By combining somewhat incompatible resins, there is a certain amount of separation of an unctuous phase which imparts a high gloss to the molded product, and possibly by adsorption at the surfaces of the filler materials increases the bonding strength of the binder.

The incompatibility of resin mixtures may be most satisfactorily indicated by the measurement of the penetration of a sphere when pressed into a plastic compositoin formed of the resin mixtures by a definite load. The depth of penetration follows the law defined by the McBurney formula:

$$i = At^M$$

where
$i$ = indentation in mils
$A$ = A-value, a constant which is actually the indentation when $t=1$ min. (the initial penetration)
$t$ = time in minutes
$M$ = M-value, a constant for that medium.

The measurements hereinafter given were determined with an apparatus utilizing a sphere having a diameter of one-fourth inch. The zero reading was obtained immediately after application of the sphere to the plastic composition under a load of two pounds and subsequent readings were obtained at the designated time intervals after an additional load of twenty-eight pounds (making a total load of thirty pounds) was applied to the sphere, the readings obtained at such intervals being corrected by the zero reading to obtain the values hereinafter given.

By combining a hard resin with the pitchy ingredient in the proper proportions a molding composition composed of such binder with fillers can be obtained having any desired initial penetration and any desired M-value. However, it has been found that, in order to obtain the proper flow and molding characteristics in the powdered composition to adapt it for the single-step molding process in which the powders are subjected to pressure without heat and in order to obtain a good surface appearance having a satisfactory gloss or luster on the molded articles, the initial penetration of the composition should be from about 0.005 to 0.015 inch (in the first minute) and the M-value should be from about 0.08 to 0.15. The measurements may be made upon a sheet of the material obtained after working the material upon heated friction rolls or they may be made upon a sample article made on a test or preliminary run. Molded pieces having a penetration lower than 0.005 inch in the first minute are too hard to form readily in a machine while pieces having more than 0.015 inch initial penetration are so soft and sticky that either the powder is tacky and lumpy so that it is not readily charged into the mold, or the finished article sticks to the mold and is tacky to the touch, or both circumstances may occur. The M-value should not be lower than 0.08 since this is indicative of a system which is too incompatible and which will form a molded article with lack of strength and having a tendency to "sweat" out or exude any soft oily matter that may occur in the asphalt or pitch used. On the other hand, the M-value should not be in excess of 0.15 since this indicates a more compatible mixture which would result in a tendency of the powder to lump and of the molded articles to stick to the molds, and in the production of soft molded articles which are highly thermoplastic.

The hard resin is combined with a relatively softer pitchy resin, such as the hard asphalts known as Cuban asphalt, gilsonite or steamed gilsonite, or with the extract of lignites known as montan wax, or with other resinous materials, such as stearine pitch. Advantageously, mixtures of the hard resin with such of the softer pitchy resins as are solid may be plasticized to a certain extent by such materials as stearine pitch (the still residue in obtaining fatty acids from fats and oils) "linoleum cement" (oxygen-bodied linseed oil) or similar viscous fatty pitches, such plasticizing pitch being used with or without a waxy plasticizer, such as paraffin wax. These plasticizing materials may be used in amounts up to about twenty per cent by weight of the binder. It is advantageous to use both of the plasticizers mentioned above together, since the pitch has the tendency to strengthen the mixture and improves the wetting property of the powdered resins for the fillers, while the addition of wax improves the gloss of the finally molded tops. Calcium or zinc stearate or stearic acid may be added in small amounts to lubricate the molds.

The binder composed of the hard resin, softer resinous pitchy matter, and, if desired, plasticizer is compounded with fillers and a pigment. Filling materials such as whiting, asbestos, mica, clay, talc, wood flour, cork flour or cotton flock may be used separately or in combination—the fibrous materials, such as asbestos and cotton flock, imparting added strength to the molded composition, while the whiting, clay, and talc improve the surface characteristics. Any desired pigments may be added to color the articles. The total proportion of filler and pigment may amount to sixty-five per cent to seventy-five per cent by weight of the total composition.

In general, the binding materials are mixed first and the fillers and pigments added thereto. The mixing is performed upon heated friction rolls until the batch is homogeneous, when a sheet of the composition is rolled. This sheet is subjected to the penetration test, and if the test indicates that it does not fall within the limits of initial penetration and of M-value as given above, suitable additions are made and the mixture again compounded until the proper values are obtained. The sheet obtained from the homogeneous batch having the proper initial penetration and M-value is then ground in a suitable mill and sieved. All particles which will not pass a 30-mesh screen are reground since it has been found that to form molded articles having suitable structural strength and surface characteristics, it is necessary that the powdered batch contain particles of a size preferably ranging between 30 to 200-mesh (standard screen sizes). A certain proportion of even finer particles is permissible, but the proportion should not be large, especially if the fine particles are finer than a 200-mesh screen, since it has been found that very fine powder tends to foul the mold. In cases where small amounts of fibrous materials, such as cotton flock or asbestos floats are used in the fillers, it may be necessary to add such materials after the screening step. The homogeneous powder is fed into the molding press, which may be any type of machine which is operated without the use of heat.

The products resulting from the single molding operation have good surface appearance and excellent structural strength so that no subsequent baking step need be applied. However, if it is desired to improve the superficial appearance and to increase the internal strength somewhat, the molded articles may be baked. The molded article may also be coated with a thin film of clear resin, such as resins of the polyvinyl or poly-acrylate type in the form of aqueous emulsions, to impart to the molded article a tough and a lustrous finish.

The molding composition is suitable for producing numerous articles, such as buttons, electrical fittings, embossed tops for cork stoppers, and mastic tile.

*Example 1*

A mixture of the following materials was compounded on heated friction rolls until the batch was homogeneous:

| | Parts by weight |
|---|---|
| Cuban asphalt | 15 |
| Vinsol | 12 |
| Stearine pitch | 3 |
| Calcium stearate | ½ |
| Whiting | 61½ |
| Iron oxide pigment | 5 |
| Cotton flock | 2 |

A sheet formed of the worked composition had an M-value of about 0.13 and an initial penetration value of about 0.010. The sheet was ground and charged into the feed hopper of the molding machine. The composition was molded into the form of embossed tops which were adhesively joined to cork stoppers.

*Example 2*

| | Parts by weight |
|---|---|
| Gilsonite | 12 |
| Vinsol | 10 |
| Stearic acid | 1 |
| Stearine pitch | 2 |
| Paraffin wax | 2 |
| Cotton flock | 1 |
| Pigments | 2 |
| Filler (slate flour and asbestos) | 70 |

A mixture of the above ingredients was compounded on heated friction rolls and as in the preceding example, embossed tops were formed by molding and they were adhered to cork stoppers.

*Example 3*

| | Parts by weight |
|---|---|
| Linseed oil oxygen-bodied to a solid pitchy condition | 5 to 10 |
| Vinsol | 20 to 25 |
| Pigments | 5 |
| Paraffin wax | 2 |
| Whiting | 63 |

The invention is not limited to the specific examples or preferred proportions recited above, which have been given merely for illustrative purposes, but may be otherwise embodied or practiced within the scope of the following claims.

I claim:

1. A composition substantially free of volatile constituents suitable for cold-molding comprising about 65 to about 75 parts by weight of a filler in about 35 to about 25 parts by weight of a binder, said binder comprising a resinous pitchy material and a resin having a higher melting point and exhibiting a degree of incompatibility with said resinous pitchy material such that a molded piece of the composition has an initial penetration value between about 0.005 and 0.015 inch in the first minute and an M-value between about 0.08 and 0.15.

2. A composition substantially free of volatile constituents suitable for cold-molding comprising about 65 to about 75 parts by weight of a filler in about 35 to about 25 parts by weight of a binder, said binder comprising a hard asphalt and a resin having a higher melting point than said asphalt, said resin and said asphalt exhibiting a degree of incompatibility such that a molded piece of the composition has an initial penetration value between about 0.005 and 0.015 inch in the first minute and an M-value between about 0.08 and 0.15.

3. A composition substantially free of volatile constituents suitable for cold-molding comprising about 65 to about 75 parts by weight of a filler in about 35 to about 25 parts by weight of a binder, said binder comprising a petroleum naphtha-insoluble pine stump-wood resin mixed with a hard asphalt, said resin and said asphalt exhibiting a degree of incompatibility such that a molded piece of the composition has an initial penetration value between about 0.005 and 0.015 inch in the first minute and an M-value between about 0.08 and 0.15.

4. A composition substantially free of volatile constituents suitable for cold-molding comprising about 65 to about 75 parts by weight of a filler in about 35 to about 25 parts by weight of a binder, said binder comprising a solid resin and a solid resinous oxidized and polymerized fatty material, said resin and resinous material exhibiting a degree of incompatibility with respect to each other such that a molded piece of the composition has an initial penetration value between about 0.005 and 0.015 inch in the first minute and an M-value between about 0.08 and 0.15.

5. A composition substantially free of volatile constituents suitable for cold-molding comprising about 65 to about 75 parts by weight of a filler in about 35 to about 25 parts by weight of a binder, said binder comprising a solid resin and a solid resinous pitchy material together with a plasticizer for said resins, said plasticizer constituting up to about 20% by weight of the binder, said resin, resinous material, and plasticizer exhibiting a degree of incompatibility with respect to each other such that a molded piece of the composition has an initial penetration value between about 0.005 and 0.015 inch in the first minute and an M-value between about 0.08 and 0.15.

6. A composition substantially free of volatile constituents suitable for cold-molding comprising about 65 to about 75 parts by weight of a filler in about 35 to about 25 parts by weight of a binder, said binder comprising a hard asphalt and a resin having a higher melting point than said asphalt, together with a plasticizer, said plasticizer constituting up to about 20% by weight of the binder, said asphalt, resin, and plasticizer exhibiting a degree of incompatibility with respect to each other such that a molded piece of the composition has an initial penetration value between about 0.005 and 0.015 inch in th first minute and an M-value between about 0.08 and 0.15.

7. A cold molded stopper top having a composition comprising about 65 to about 75 parts by weight of a filler in about 35 to about 25% by weight of a binder, said binder comprising a resinous pitchy material and a resin having a higher melting point than said resinous material and exhibiting a degree of incompatibility with said resinous material such that the molded top has an initial penetration value between 0.005 and 0.015 inch in the first minute and an M-value between 0.08 and 0.15.

8. In a method of compounding compositions suitable for cold-molding, the steps of compounding a mixture of substantially non-volatile ingredients comprising a filler and a binder comprising a resinous pitchy material and a resin having a higher melting point than said resinous material to form a homogeneous mass, determining the M-value and initial penetration value of said mass, and modifying said mixture by compounding with additional portions of any of said binder ingredients until a homogeneous mass having an initial penetration value between about 0.005 and 0.015 inch in the first minute and an M-value between about 0.08 and 0.15 is obtained.

9. In a method of compounding compositions suitable for cold-molding, the steps of compounding a mixture of substantially non-volatile ingredients comprising a filler and a binder comprising a hard resinous pitchy material, a resin having a higher melting point than said resinous material, and a plasticizer for said resin and resinous material to form a homogeneous mass, determining the M-value and the initial penetration value of said mass, and modifying said mixture by compounding with additional portions of any of said binder ingredients until there is obtained a homogeneous mass having an M-value between about 0.08 and 0.15 and an initial penetration value between about 0.005 and 0.015 inch in the first minute.

10. In a method of compounding compositions suitable for cold-molding, the steps compounding a mixture of substantially non-volatile ingredients comprising a filler and a binder comprising a petroleum naphtha-insoluble pine stump-wood resin and a hard asphalt and a plasticizer for said resin and asphalt to form a homogeneous mass, then determining the M-value and initial penetration value of said mass, and modifying said mixture by compounding with additional portions of any of said binder ingredients until a homogeneous mass is obtained having an M-value between about 0.08 and 0.15 and an initial penetration value between about 0.005 and 0.015 inch in the first minute.

11. A composition substantially free of volatile constituents suitable for cold-molding comprising about 67 parts of filling material, about 15 parts of a hard asphalt, about 12 parts of a petroleum naphtha-insoluble pine stump-wood resin, and up to about 6.75 parts of stearine pitch, said ingredients exhibiting degree of incompatibility with respect to each other such that a molded piece of the composition has an initial penetration value between about 0.005" and 0.015" in the first minute and an M value between about 0.08 and 0.15.

12. A cold-molded stopper top having a composition comprising about 67 parts by weight of filling material, about 15 parts of a hard asphalt, about 12 parts of petroleum naphtha-insoluble pine stump-wood resin, and up to about 6.75 parts of stearine pitch, said ingredients exhibiting a degree of incompatibility with respect to each other such that said stopper has an initial penetration value between about 0.005" and 0.015" in the first minute and an M value between about 0.08 and 0.15.

13. A composition substantially free of volatile constituents suitable for cold-molding comprising about 67 parts by weight of filling material, about 15 parts by weight of a solid resinous pitchy material, about 12 parts by weight of a resin having a higher melting point than said pitchy material, and up to about 6.75 parts of stearine pitch, said ingredients exhibiting a degree of incompatibility with respect to each other such that a cold-molded piece of the composition has an initial penetration value between about 0.005" and 0.015" in the first minute and an M-value between about 0.08 and 0.15.

14. A composition substantially free of volatile constituents suitable for cold-molding comprising about 63 parts by weight of filling material, about 5 to 10 parts by weight of a solid resinous oxidized and polymerized fatty material, and about 20 to 25 parts by weight of petroleum naphtha-insoluble pine stump-wood resin, said ingredients exhibiting a degree of incompatibility with respect to each other such that a cold-molded piece of the composition has an initial penetration value between about 0.005" and 0.015" in the first minute and an M-value between about 0.08 and 0.15.

15. A composition substantially free of volatile constituents suitable for cold molding comprising about 65 to about 75 parts by weight of filling material and about 35 to about 25 parts by weight of a binder comprising about 5 to about 15 parts by weight of solid resinous pitchy material and about 10 to about 25 parts by weight of a resin having a higher melting point than said pitchy material, said ingredients exhibiting a degree of incompatibility with respect to each other such that a cold molded piece of the composition has an initial penetration value between about 0.005 inch and about 0.015 inch in the first minute and an M-value between 0.08 and 0.15.

16. A composition substantially free of volatile constituents suitable for cold molding comprising about 65 to about 75 parts by weight of filling material and about 35 to about 25 parts by weight of a binder comprising about 5 to about 15 parts by weight of a solid resinous pitchy material, about 10 to about 25 parts by weight of a resin having a higher melting point than said resinous material, and a plasticizer for said resinous material and said resin in an amount up to about 20% of the total weight of the binder, said ingredients exhibiting a degree of incompatibility with respect to each other such that a cold molded piece of the composition has an initial penetration value between 0.005 inch and 0.015 inch in the first minute and an M-value between about 0.08 and about 0.15.

17. A composition substantially free of volatile constituents suitable for cold molding comprising about 65 to about 75 parts by weight of filling material and about 35 to about 25 parts by weight of a binder comprising about 5 to about 10 parts by weight of a solid resinous oxidized and polymerized fatty material and about 20 to about 25 parts by weight of petroleum-naphtha-insoluble pine stump-wood resin, said ingredients exhibiting a degree of incompatability with respect to each other such that a cold molded piece of the composition has an initial penetration value between 0.005 inch and 0.015 inch in the first minute and an M-value between about 0.08 and 0.15.

18. In a method of compounding compositions suitable for cold molding, the steps of compounding a mixture of substantially non-volatile ingredients comprising a filler and a binder comprising a solid resinous oxidized and polymerized fatty material and a petroleum-naphtha-insoluble pine stump-wood resin to form a homogeneous mass, then determining the M-value and initial penetration value of said mass, and modifying said mixture by changing the relative proportions of binder ingredients to form a homogeneous mass having an M-value between 0.008 and 0.015 and an initial penetration between 0.005 and 0.015 inch in the first minute.

PAUL O. POWERS.

CERTIFICATE OF CORRECTION.

Patent No. 2,365,491. December 19, 1944.

PAUL O. POWERS.

It is hereby certified that error appears in the printed specification of the above numbered patent requiring correction as follows: Page 3, second column, line 37, claim 7, for "25%" read --25 parts--; and that the said Letters Patent should be read with this correction therein that the same may conform to the record of the case in the Patent Office.

Signed and sealed this 20th day of March, A. D. 1945.

Leslie Frazer (Seal) Acting Commissioner of Patents.